(12) United States Patent
Fukuta et al.

(10) Patent No.: US 11,876,438 B2
(45) Date of Patent: Jan. 16, 2024

(54) REDUCING INPUT HARMONIC DISTORTION IN A POWER SUPPLY

(71) Applicant: INNOMOTICS GMBH, Nuremberg (DE)

(72) Inventors: Yusuke Fukuta, Houston, TX (US); Mukul Rastogi, Delmont, PA (US); Richard H. Osman, Pittsburgh, PA (US)

(73) Assignee: Innomotics GmbH, Nuremberg (DE)

( * ) Notice: Subject to any disclaimer, the term of this patent is extended or adjusted under 35 U.S.C. 154(b) by 194 days.

(21) Appl. No.: 17/309,932

(22) PCT Filed: Jan. 3, 2020

(86) PCT No.: PCT/US2020/012144
§ 371 (c)(1),
(2) Date: Jul. 1, 2021

(87) PCT Pub. No.: WO2020/142661
PCT Pub. Date: Jul. 9, 2020

(65) Prior Publication Data
US 2022/0077762 A1    Mar. 10, 2022

Related U.S. Application Data

(60) Provisional application No. 62/788,247, filed on Jan. 4, 2019.

(51) Int. Cl.
*H02M 1/12* (2006.01)
*H02M 7/538* (2007.01)
(Continued)

(52) U.S. Cl.
CPC ............... *H02M 1/12* (2013.01); *H02M 7/49* (2013.01); *H02M 7/5395* (2013.01); *H02M 7/53875* (2013.01); *H02M 7/53876* (2021.05)

(58) Field of Classification Search
CPC ......... H02M 7/53875; H02M 7/53876; H02M 7/5395; Y02B 70/10
See application file for complete search history.

(56) References Cited

U.S. PATENT DOCUMENTS 5,625,545 A * 4/1997 Hammond ............... H02M 7/49
363/71
6,166,513 A * 12/2000 Hammond ............ H02M 7/797
318/764

(Continued)

FOREIGN PATENT DOCUMENTS

CN       105141144 B    11/2017
EP         1128538 A2     8/2001
(Continued)

OTHER PUBLICATIONS

PCT International Search Report and Written Opinion of International Searching Authority dateded Apr. 14, 2020 corresponding to PCT International Application No. PCT/US2020/012144 filed Jan. 3, 2020.

*Primary Examiner* — Yusef A Ahmed

(57) ABSTRACT

Provided are embodiments for a system for reducing input harmonic distortion of a power supply. The system includes a power source coupled to a power supply. The power supply includes an input stage that is configured to receive an input signal from the power-supply, wherein the input signal is received at known input frequency, and a converting stage that is operated to convert the input signal to an output signal, wherein the output signal has an output frequency. The power supply also includes an output stage that is operated to generate output power based on the output signal, and a controller that is configured to provide control signals to the output stage of the power supply to modify the (Continued)

output signal. Also provided are embodiments for a power supply and method for reducing input harmonic distortion of the power supply.

11 Claims, 6 Drawing Sheets

(51) Int. Cl.
*H02M 7/49* (2007.01)
*H02M 7/5387* (2007.01)
*H02M 7/5395* (2006.01)

(56) References Cited

U.S. PATENT DOCUMENTS

| | | | | |
|---|---|---|---|---|
| 6,229,722 | B1* | 5/2001 | Ichikawa | H02M 7/49 363/71 |
| 6,262,555 | B1* | 7/2001 | Hammond | H02P 3/18 318/807 |
| 6,301,130 | B1* | 10/2001 | Aiello | H02M 7/49 363/39 |
| 6,320,767 | B1* | 11/2001 | Shimoura | H02M 7/49 363/37 |
| 7,830,681 | B2* | 11/2010 | Abolhassani | H02M 7/49 363/37 |
| 8,279,640 | B2* | 10/2012 | Abolhassani | H01F 30/12 363/37 |
| 8,345,455 | B2* | 1/2013 | Jeon | H02M 7/49 363/71 |
| 9,083,274 | B2* | 7/2015 | Liu | H02M 5/453 |
| 9,876,347 | B2* | 1/2018 | Bousfield, III | H02M 7/49 |
| 11,211,879 | B2* | 12/2021 | Abuelnaga | H02M 7/49 |
| 11,342,878 | B1* | 5/2022 | Abuelnaga | H02M 7/49 |
| 2001/0038541 | A1* | 11/2001 | Hammond | H02M 7/483 363/40 |
| 2004/0145337 | A1* | 7/2004 | Morishita | H02M 7/487 318/801 |
| 2006/0274560 | A1* | 12/2006 | Rastogi | H02M 5/458 363/131 |
| 2006/0279249 | A1* | 12/2006 | Rastogi | H02P 27/16 318/807 |
| 2007/0058405 | A1* | 3/2007 | Bousfield | H02M 1/12 363/132 |
| 2007/0109823 | A1* | 5/2007 | Rastogi | H02M 7/49 363/40 |
| 2008/0218320 | A1* | 9/2008 | Jang | H02M 7/49 375/238 |
| 2009/0302682 | A1* | 12/2009 | Hammond | H02M 7/49 307/52 |
| 2010/0327793 | A1* | 12/2010 | Komulainen | H02M 5/225 307/151 |
| 2012/0126628 | A1* | 5/2012 | Bjerknes | H02M 7/483 363/157 |
| 2013/0093376 | A1* | 4/2013 | Yoo | H02M 5/4585 318/503 |
| 2013/0286704 | A1* | 10/2013 | Liu | H02M 7/49 363/132 |
| 2014/0032145 | A1* | 1/2014 | Yoo | G01R 27/2605 702/65 |
| 2014/0062354 | A1* | 3/2014 | Choi | H02M 5/4585 318/812 |
| 2014/0063871 | A1* | 3/2014 | Bousfield, III | H02M 5/4585 363/37 |
| 2015/0256095 | A1* | 9/2015 | Ohta | H02P 21/0003 363/37 |
| 2016/0141973 | A1* | 5/2016 | Abdalla | H02M 5/4585 363/36 |
| 2017/0288562 | A1* | 10/2017 | Palle | H02M 7/49 |
| 2017/0338764 | A1* | 11/2017 | Irie | H02M 1/12 |
| 2018/0191286 | A1* | 7/2018 | Lee | H02M 1/425 |
| 2018/0241317 | A1* | 8/2018 | Abdalla | H02M 7/483 |
| 2021/0058003 | A1* | 2/2021 | Ni | H02M 5/4585 |
| 2022/0200479 | A1* | 6/2022 | Ni | H02M 7/483 |
| 2023/0071003 | A1* | 3/2023 | Zhou | H02M 1/4225 |

FOREIGN PATENT DOCUMENTS

WO 2006130452 A2 12/2006
WO 2018033214 A1 2/2018

* cited by examiner

| Freq [Hz] | La | Lb | Lc |
|---|---|---|---|
| 50 | 100% | 100% | 100% |
| 150 | 10.6% | 9.2% | 10.4% |
| 250 | 1.0% | 0.6% | 0.8% |
| THD | 10.6% | 9.2% | 10.4% |

| Freq [Hz] | La | Lb | Lc |
|---|---|---|---|
| 50 | 100% | 100% | 100% |
| 51 | 5.6% | 5.6% | 5.6% |
| 151 | 5.0% | 4.9% | 4.7% |
| 152 | 1.2% | 1.3% | 1.6% |
| 252 | 0.9% | 0.9% | 0.9% |
| 250 | 0.8% | 0.9% | 0.9% |
| THD | 7.7% | 7.7% | 7.7% |

REDUCING INPUT HARMONIC DISTORTION IN A POWER SUPPLY

BACKGROUND

This present invention generally relates to a power supply with three-phase input power and single-phase load. The present disclosure is related to reducing input harmonic distortion in such a power supply.

Many power supplies utilize a rectifier as the front-end converter to transform a three-phase input to a substantially direct current (DC) output. The rectifier produces 6-pulse harmonic currents in its input while providing output voltage harmonics at multiples of 6 times the input frequency. A capacitor bank is used at the rectifier output to filter some of these voltage harmonics and attenuate the harmonics produced by the output alternating current (AC) inverter which transforms the DC voltage to a variable frequency output voltage. The AC inverter may have a three-phase output or a single-phase output depending on the requirement of the load. In some applications the configuration of rectifier, the DC capacitor and the inverter constitute the entire power supply feeding a load. Individually, such a configuration is referred to as a power cell in this disclosure.

In other applications such as described in an exemplary embodiment, multiple power cells are used to form a medium voltage producing circuit at the output while utilizing a multi-secondary winding transformer on the input to feed each of the rectifiers. The inverter in each power cell has a single-phase output that is connected in series with inverters from other power cells to provide a medium voltage output in each phase. A three-phase output load can be connected, or in a simpler form a single-phase load can be powered if only one output phase is used. The secondary windings of the transformer are phase-shifted to cancel the 6-pulse harmonics generated by the individual rectifiers. The input currents or the primary winding currents in the multi-winding transformer have greatly reduced harmonics as a result of the harmonic cancellation.

When the load is a three-phase balanced load, the total output power delivered has a substantially DC value. The input source of the power supply is then required to provide substantially constant power resulting in balanced currents. Harmonic distortion in the input currents is also low due to the use of phase-shifted secondary windings. The problem arises when the load is a single-phase load and the output power then has a substantial fluctuation at two times the output frequency. This fluctuation is not attenuated by the capacitor bank because its primary function is to filter the harmonics at 6 times the input frequency and those harmonics at the switching frequency of the inverter. The output power fluctuation gets transferred to the input side of the power supply which then creates unwanted frequencies to appear. These currents may cause undesirable effects such as flicker and harmonic losses in the power system feeding the power supply.

SUMMARY

Embodiments of the present disclosure are directed to a system for reducing input harmonic distortion of a power supply. A non-limiting example of the system includes a power source coupled to a power supply. The power supply includes an input stage configured to receive an input signal from the power-supply, wherein the input signal is received at known input frequency, and a converting stage operated to convert the input signal to an output signal, wherein the output signal has an output frequency. The power supply also includes an output stage operated to generate output power based on the output signal, and a controller configured to provide control signals to the output stage of the power supply to modify the output signal.

In addition to one or more of the features described herein, or as an alternative, further embodiments include a controller having controls to modify the output signal and a pulse-width modulation (PWM) module. In one or more embodiments, the controls modify the output signal by injecting a different frequency component into the output signal.

In addition to one or more of the features described herein, or as an alternative, further embodiments include injecting a frequency component that is three times the output frequency of the output signal and has a phase-shift dependent on a load power factor which reduces distortion at the input stage of the power supply.

Embodiments of the present disclosure are directed to a method for reducing input harmonic distortion in a power supply. A non-limiting example of the method includes receiving a signal representing an input voltage and estimating input frequency of the signal, receiving an output frequency command and comparing output frequency with the input frequency, and based at least in part on the comparison, modifying the output frequency to maintain a difference between the input frequency and the output frequency. The method also includes receiving output voltage and current signals, and estimating an output current phase angle with respect to the output voltage, generating an output voltage command based at least in part on the output frequency and the output current phase angle, and providing the output voltage command to a controller to generate switching signals.

Embodiments of the present disclosure are directed to a power supply for reducing input harmonic distortion. A non-limiting example of the power supply includes an input stage that is configured to receive an input signal from a power-supply, wherein the input signal is received having a known input frequency, and an output stage that is configured to provide output power at an output frequency. The power supply also includes a controller that is configured to provide control signals to the output stage of the power supply, wherein the controller further comprises controls and a pulse-width modulation (PWM) module to generate the controls to modify the output signal, the controls modify an output signal by injecting a frequency component into the output signal having a phase-shift dependent on a load power factor to drive a single-phase load.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1A:
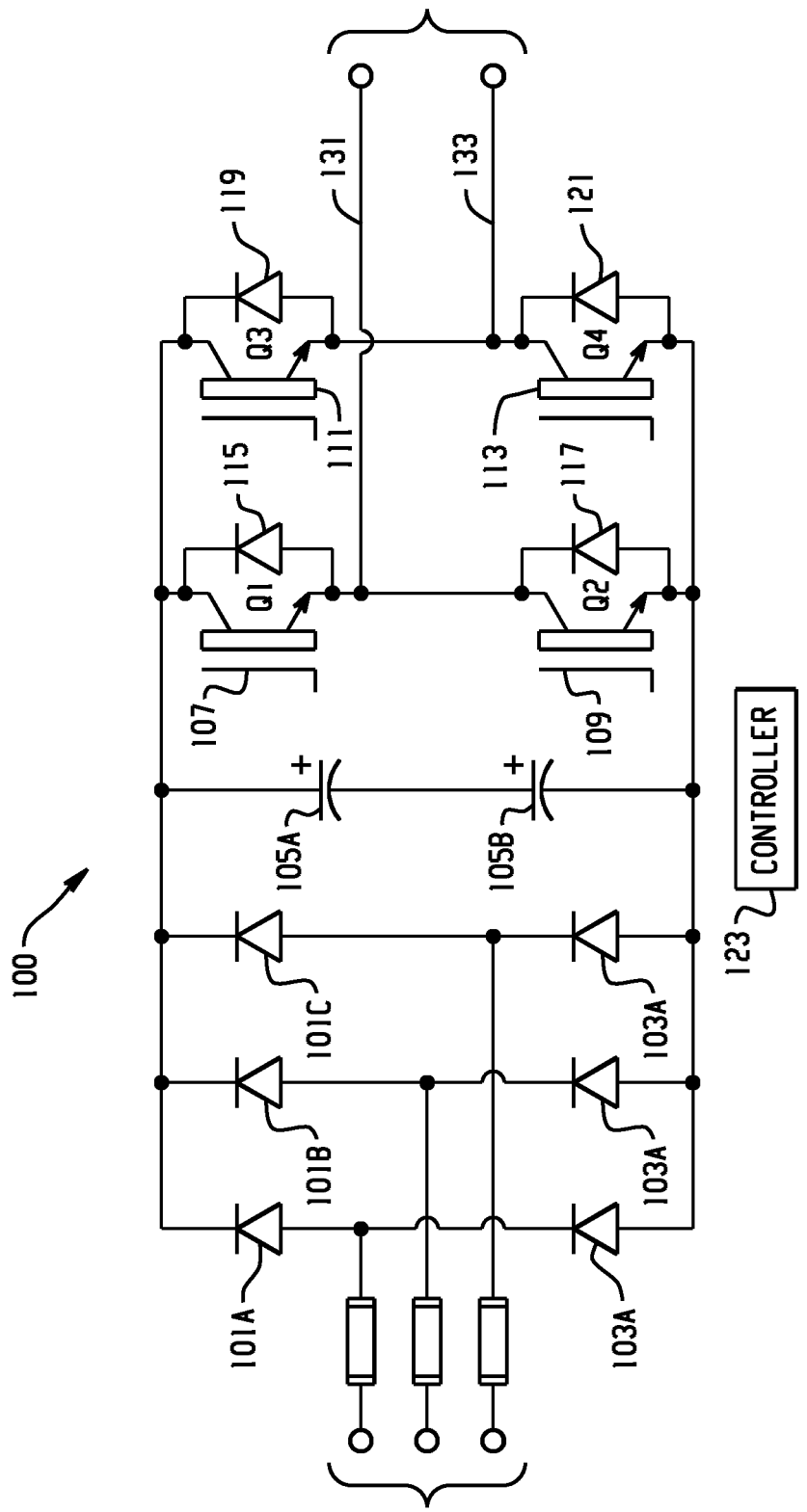
FIG. 1a depicts a diagram of a system and power supply for reducing input harmonic distortion in accordance with one or more embodiments.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

The components and materials described hereinafter as making up the various embodiments are intended to be illustrative and not restrictive. Many suitable components and materials that would perform the same or a similar function as the materials described herein are intended to be embraced within the scope of embodiments of the present invention.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the disclosure may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the disclosure, a power supply with a three-phase input and a single-phase load on the output is provided. The fluctuation of the output power and the resulting impact on the input currents can be shown through the following analysis.

Neglecting the switching harmonics of the inverter, if the output voltage $v_o$ and current $i_o$ of the power supply are defined by following Equations 1 and 2:

$$v_o = \sqrt{2} V_o \sin(\omega_o t) \quad \text{Eq. 1}$$

and $$i_o = \sqrt{2} I_o \sin(\omega_o t - \varnothing_o) \quad \text{Eq. 2}$$

where $V_o$ and $I_o$ are the RMS values of the output voltage and current, respectively; $\omega_o$ is the angular frequency of the output and equal to $2\pi f_o$; $f_o$ is the output frequency; and $\varnothing_o$ is the phase angle of the output current with respect to the voltage.

Then, the output power $p_o$ is given by Equation 3 as:

$$p_o = V_o I_o \cos(\varnothing_o) - V_o I_o \cos(2\omega_o t - \varnothing_o) \quad \text{Eq. 3}$$

The first term of $p_o$ is a DC component representing the average power to the load and the second term is a fluctuating term at twice the output frequency.

This power pulsation causes the input AC currents to have harmonic components as shown below. In a worst-case scenario, if the capacitor banks provide very little filtering of the power fluctuation, then all of the output power is supplied by the input source, i.e., $p_i = p_o$, where $p_i$ is the input power. If the input voltage $v_i$ is defined by the following Equation 4 as:

$$v_i = \sqrt{2} V_i \sin(\omega_i t) \quad \text{Eq. 4}$$

where $\omega_i$ is the angular frequency of the output and equal to $2\pi f_i$, and $f_i$ is the input frequency, it can be shown that the input current is of the form shown in Equation 5:

$$i_i=\sqrt{2}I_i \sin(\omega_i t-\varnothing_i)+\sqrt{2}I_x \sin[(\omega_i-2\omega_o)t-\varnothing_x]+\sqrt{2}I_y \sin[(\omega_i+2\omega_o)t-\varnothing_y]$$  Eq. 5

The input currents thus have additional harmonic components at $(f_i \pm 2f_o)$. The magnitude of these components depends on the energy storage capability within the power supply and can be high enough to cause harmonic related issues such as unbalance, flicker and harmonics in the power system that provides power to the power supply.

In a particular application, a power supply is used to generate heat across a passive resistive load such as a pipe or pipeline that is used for transporting fluid. In the field of oil exploration and production, the extraction of the oil is performed below sea level where temperatures are very low. In a non-limiting example, a passive load does not use the power from the power supply to power electrical components such as a motor. Transporting oil or other fluids at such temperatures can become difficult due to properties related to its viscosity. In a non-limiting example, the power supply is used to heat the pipeline to a proper temperature to ensure the extracted oil is able to flow through the pipeline to its destination.

Because, in a non-limiting example, the pipe is a single-phase resistive load, the quality of the output power provided from the power supply for heating applications can include a greater amount of distortion than power applications such as powering an induction motor. The induction motor requires a high-quality output power signal with minimal distortion, and the quality of the signal must be maintained to ensure proper operation of the electric machine.

The techniques that are described herein are directed to addressing the distortion at the input stages of the power supply, as opposed to the output stage. Because the load, in a non-limiting example, is a pipe that needs to be heated for transporting fluids, the amount of distortion in the output power provided by the power supply is not of great consequence. Therefore, operating the power supply to provide constant output power can reduce the distortion seen at the input of the power supply.

The power provided by the power supply pulsates at twice the output frequency $f_o$ of the power supply. This pulsation must also be provided by the power source feeding the power supply, and the pulsation can cause distortion in the input phase currents. Excessive input harmonic distortion on the phase currents can produce many undesirable effects and an unbalance between the input phase currents can lead to unwanted heating of the power supply components and premature failure. In order to avoid or minimize the pulsating power which can be fed back to the power source or utility feed, the output power can be modulated and injected with a frequency component to approximate a constant which in effect reduces the harmonics at the input of the power supply. This can reduce and/or eliminate the harmonics that result from the power pulsations.

Turning now to an overview of the aspects of the disclosure, one or more embodiments of the disclosure address the above-described shortcomings of the prior art by injecting a frequency component at the output stage of the power supply to offset and/or eliminate the harmonics at the input of the power supply.

In an embodiment of the present disclosure, a system is provided for a variable frequency drive operably coupled to single-phase resistive load, such as for example, a metal pipe. A power supply output voltage (output voltage of the variable frequency drive) is modulated with a frequency component at three (3) times of an output frequency $(3*f_o)$. This allows for the reduction of power pulsation in the power provided to the load and the reduction of the harmonics that are generated on the input side of the power supply as described below.

The output voltage $v_o$ is now defined to include an additional component at the third harmonic and is now provided as shown in Equation 6:

$$v_o=\sqrt{2}V_o \sin(\omega_o t)+\sqrt{2}V_{3o} \sin(3\omega_o t+\varnothing_{3o})$$  Eq. 6 and the current $i_o$ of the power supply remains substantially the same due to the load characteristic and is defined by the following Equation 7:

$$i_o=\sqrt{2}I_o \sin(\omega_o t-\varnothing_o)$$  Eq. 7 where $V_{3o}$ is the RMS value of the third harmonic component in the output voltage, and $\varnothing_{3o}$ is an adjustable phase angle of the third harmonic component with respect to the fundamental component of the voltage.

The output power $p_o$ is defined in Equation 8 as:

$$p_o=V_o I_o \cos(\varnothing_o)-V_o I_o \cos(2\omega_o t-\varnothing_o)+V_{3o}I_o \cos(2\omega_o t+\varnothing_o+\varnothing_{3o})-V_{3o}I_o \cos(4\omega_o t-\varnothing_o+\varnothing_{3o}),$$  Eq. 8

From Equation 8 above, it can be seen that modulation of the output voltage with a component at $3*f_o$ results in additional power pulsations at $2*f_o$ and $4*f_o$, but the total component at $2*f_o$ can be reduced by choosing a correct phasing of the $3*f_o$ component with respect to the fundamental frequency component. The harmonic frequencies at the output are at $(f_i \pm 2*f_o)$ and $(f_i \pm 4*f_o)$. The components at $(f_i \pm 2*f_o)$ are reduced because of cancellation provided by the introduction of appropriate phase-shift of the $3*f_o$ component, while reduction of the $(f_i \pm 4*f_o)$ components is provided because of the energy storage components, for example the DC capacitor banks, which filter more of the higher frequency components at $4*f_o$.

In FIG. 1a, an example of a power supply 100 that converts three-phase AC power from a power source and provides a single-phase output is shown. The input stage of the power supply 100 is a rectification stage and includes a number of diodes 101A, 101B, 101C, 103A, 103B, and 103C to convert the input AC voltage into a voltage with a substantially DC voltage with an AC ripple.

Capacitors 105A, 105B function as smoothing filters, and the capacitors 105A, 105B are representative of a configuration of a capacitor bank, where the values for the capacitors 105A, 105B depend upon the power requirements of the load.

The DC voltage, thus conditioned, can be transformed into a variable frequency AC using a single-phase H-Bridge inverter, which can include multiple semiconductor switches. In one or more embodiments, the switches can include power transistors and as shown by transistors 107 (Q1), 109 (Q2), 111 (Q3), and 113 (Q4). The transistors 107 through 113 can include MOSFETs or insulated gate bipolar transistors (IGBTs). The transistors 107 through 113 can be either fully ON or fully OFF during operation. Transistors 107 through 113 can receive controlling signals from a controller 123. It should be understood that any type of gating controller can be used and is not limited by that shown in FIG. 1a. In addition, other configurations of single-phase output converters exist, such as neutral-point clamped (NPC).

Single-phase H-bridge output converters can reflect ripple current at twice the frequency of the output. Capacitors 105A, 105B can be used to smooth the ripple created by both the input rectifier and the output converter.

Figure 1B:
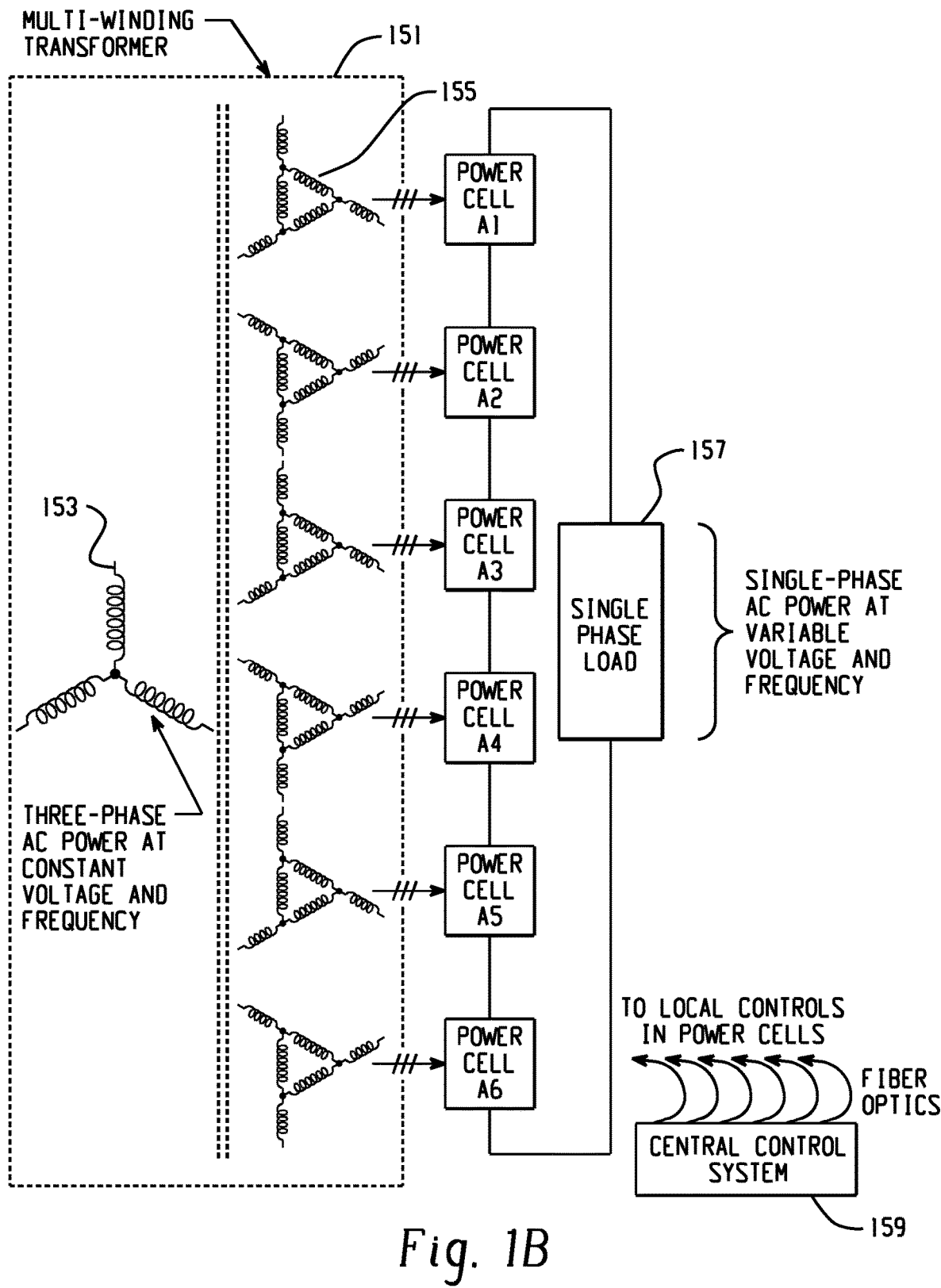
FIG. 1b depicts a diagram of a system and power supply for reducing input harmonic distortion in accordance with one or more embodiments.

The power supply shown in FIG. 1a is referred to a power cell in the following discussion. When a higher load voltage is desired, the output voltages of several power cells A1 through A6 are added by using a series connection of the output stages as shown in FIG. 1b. The control of each individual power cell A1-A6 is now performed by a central controller, such as the central control system 159, that coordinates the switching instants to generate an output voltage that is nearly sinusoidal. The central controller can be coupled to each power cell A1-A6 using fiber optic cables to provide signals for the local controls of the power cells.

Due to the three-phase rectification at the input of a power supply 100, the input currents have 6-pulse harmonics, i.e. components at the $5^{th}$, $7^{th}$, $11^{th}$, $13^{th}$, etc. harmonic exist. When multiple power cells A1-A6 are used, the unwanted 6-pulse harmonic components can be mitigated using a multi-secondary winding transformer 151, wherein each secondary winding 155 is phase-shifted from its neighbor. Each power cell input is fed by a dedicated secondary winding 155, and this allows harmonic cancellation in the currents of the primary winding 153 of the transformer 151. In one or more embodiments, the primary winding 153 is supplied with three-phase AC power at a constant voltage and frequency. The results shown in this disclosure are shown in reference to a power supply shown in FIG. 1b. It should be understood that the techniques described herein can be applied to any power supply that has a single-phase output to drive a single-phase load 157. In one or more embodiments, the single-phase load 157 is driven using single-phase AC power at variable voltage and frequency.

Figure 2:
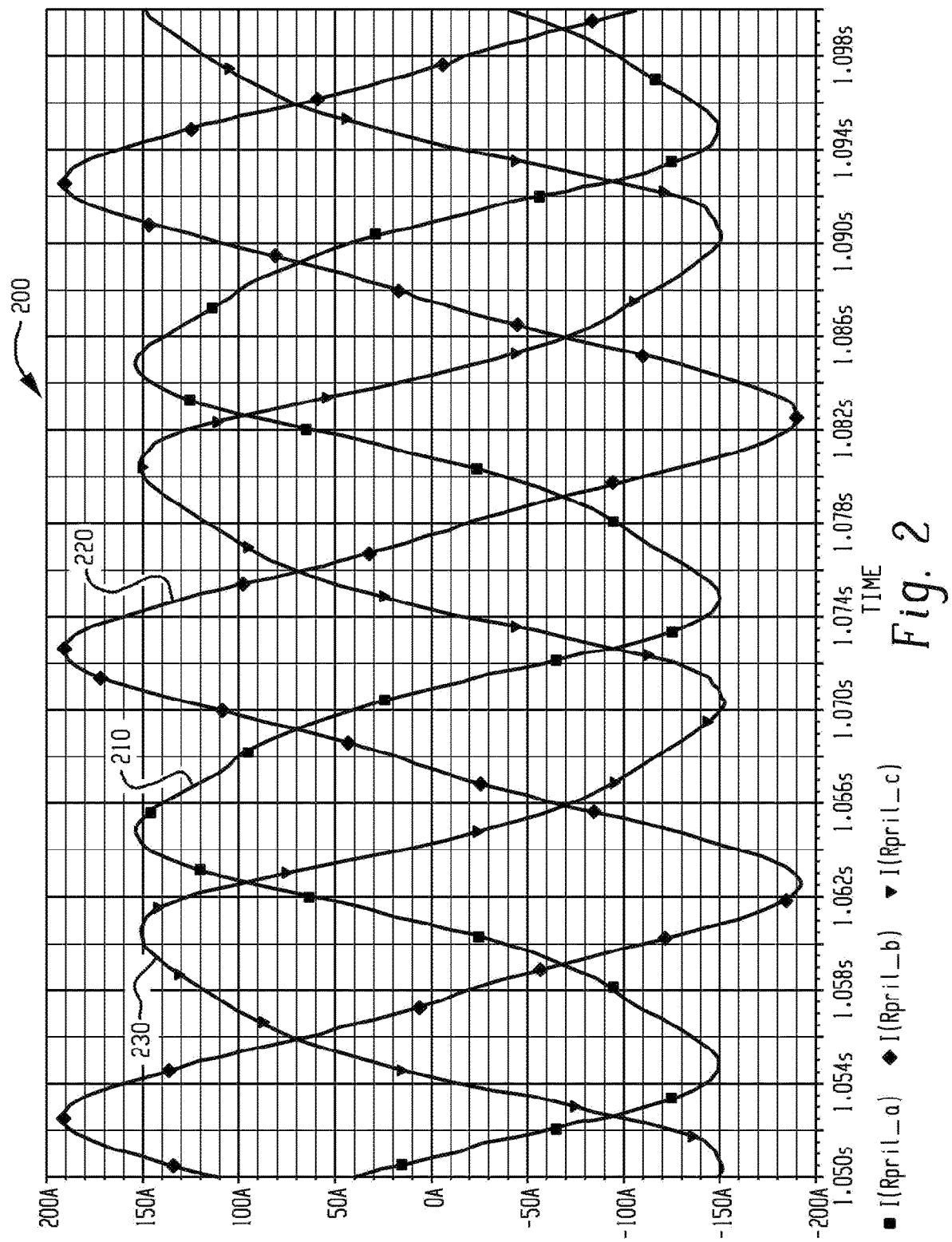
FIG. 2 depicts three-phase input current waveforms without output frequency component injection.

In FIG. 2, the input phase current waveforms are shown on the graph 200. The three-phase input currents represent the current that is supplied to the power supply from a power source when the output voltage of the power supply is modulated (at frequency $f_o=f_i$) without the $3*f_o$ component injection. Each horizontal division represents approximately 2 milliseconds, and each vertical division represents 50 amperes. The phase currents 210 and 230 have higher distortion and are further discussed below with reference to the table 300 of FIG. 3. In this example, the output voltage of the power supply 100 is provided at 50 Hz, therefore, the output power will pulsate at 100 Hz which is twice the output frequency $f_o$. The 100 Hz power pulsation causes the line side currents of the power supply 100 to pulsate to have components at 50 Hz±100 Hz, i.e. 50 Hz and 150 Hz. Since the input frequency $f_i$ is also 50 Hz, the main component will be directly affected by the pulsation in the form of unbalance.

Figure 3:
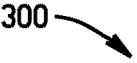
FIG. 3 depicts the harmonic components of the three-phase inputs currents of FIG. 2.

Referring to the table shown in FIG. 3, the line side currents have significant total harmonic distortion (THD), for example, phase A current has 10.6%, phase B current has 9.2%, and phase C current has 10.4%. The unbalance is illustrated by the variation in the amplitude of the phase currents 210, 220, and 230.

FIG. 3 depicts table 300 which also shows the dominant harmonic frequency components and corresponding magnitude values for the input phase currents with the fundamental frequency components normalized to 100%. As expected, the most dominant harmonic component is at 150 Hz. The next most significant harmonic occurs at 250 Hz, which is a result of the uncancelled 6-pulse harmonics in the power cell currents. However, the magnitude of the harmonics at 250 Hz is much smaller than that harmonics at 150 Hz.

Figure 4:
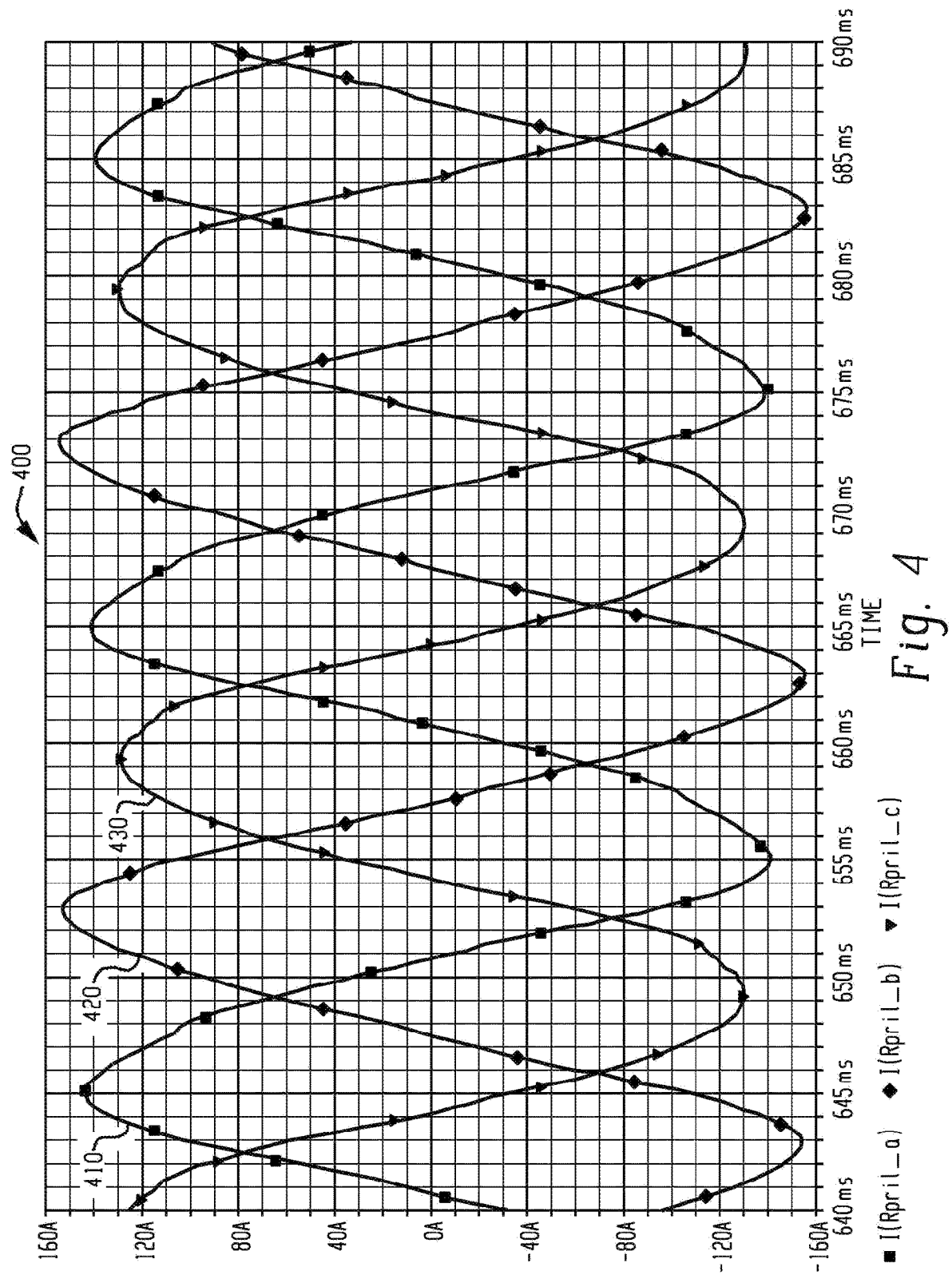
FIG. 4 depicts three-phase input current waveforms with output frequency component injection in accordance with one or more embodiments.

FIG. 4 depicts an example of a graph 400 illustrating the input current waveforms with a $3*f_o$ voltage component. The three-phase input currents 410, 420, and 430 are represented while the output voltage of the power supply is modulated at frequency $f_o$ that is slightly different from $f_i$ with the $3*f_o$ component during operation of the power supply. Each horizontal division of the graph 400 represents approximately 2 milliseconds, and each vertical division represents 40 amperes. In this example, the output voltage of the power supply 100 is provided at 50.5 Hz with an input frequency of 50 Hz. As previously described, the input currents will have harmonic components at (50 Hz±2*50.5 Hz) and (150 Hz±2*50.5 Hz), i.e. at 51 Hz, 151 Hz, 152 Hz and 252 Hz. As shown in FIG. 4, the unbalance in the three-phase input currents 410, 420, and 430 is reduced, and when measured over a 1 sec period, the current unbalance is only 0.5%.

Figures 5, 6:
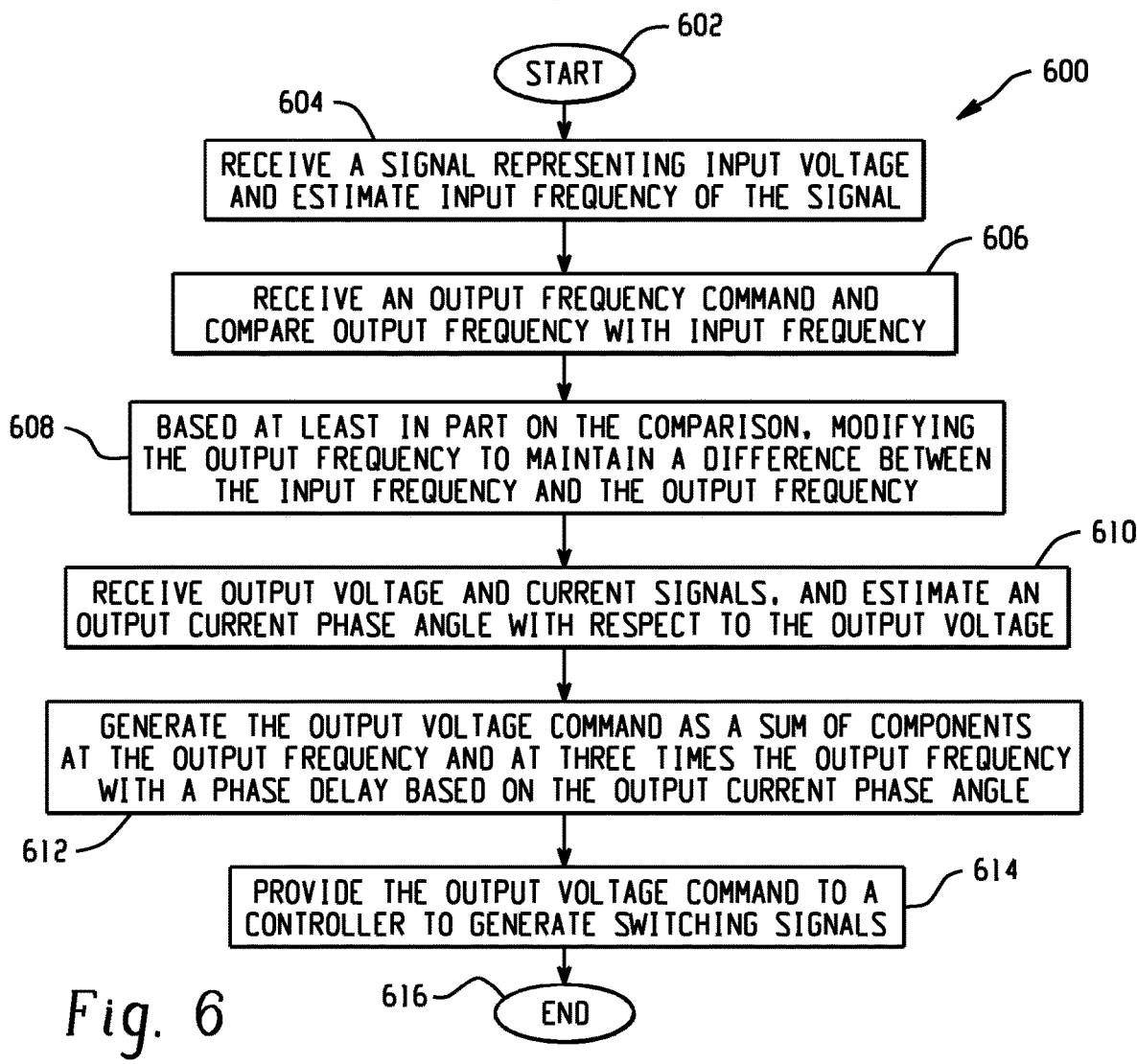
FIG. 5 depicts the harmonic components of the three-phase input current of FIG. 4.
FIG. 6 depicts a flowchart of a method for reducing the input harmonic distortion of the power supply.

FIG. 5 depicts a table 500 representing the harmonic frequency components and corresponding THD values for the three-phase input currents of a power supply while modulating the output voltage with a $3*f_o$ component injection. The harmonic components are now present at the frequencies noted above but with lower individual magnitudes and lower THD.

Comparing tables 300 and table 500, the THD values for the frequency components shown in table 500 have been reduced from the values for the frequency components shown in table 300. This can lead to a reduction in voltage distortion and unbalance among the three-phase input currents. The THD for the phase A current (La) is 7.7%, the phase B current (Lb) is 7.7%, and the phase C current (Lc) is 7.7%. Not only are the input currents 410, 420, and 430 balanced but the distortion in the input currents 410, 420, and 430 are reduced. This reduces the power pulsation at the input of the power supply.

Now referring to FIG. 6, a flowchart of a method 600 for reducing input harmonic distortion in a power supply in accordance with one or more embodiments is shown. The method 600 can be implemented in the power supply such as that shown in FIG. 1a or FIG. 1b. The method 600 begins at block 602 and proceeds to block 604 which provides for receiving an input signal and estimating the input frequency. In one or more embodiments, the input is a three-phase signal from a power source. Block 606 receives a command for the output frequency and compares the input and output frequencies.

Block 608 modifies the output frequency if the difference between the input and output frequencies is below a pre-defined limit, for e.g., 0.5 Hz. If this is the case, the output frequency is adjusted to be smaller or greater than the input frequency by the pre-defined limit. If the difference is greater than the pre-defined limit, then the output frequency is not modified. Block 610 receives signals representing output voltage and output current, and estimates the phase difference (or load power factor angle) between the voltage and current. Block 612 generates the output voltage command based on components at the updated output frequency, and at three times the output frequency and appropriate phase-shift based on load power factor.

Block 614 provides the output voltage command to a controller that generates PWM switching signals of the output switching stage of the power supply. The PWM circuit injects the desired voltage by controlling the modulation at the output stage (changes the ON/OFF time) of the power supply. In one or more embodiments of the disclosure, the PWM circuit injects a frequency component that is three times that of the output frequency in addition to the component at the switching frequency. The modified output signal provides a more constant power output from the power supply and reduces pulsation at the input side of the power supply. In turn, the distortion at the input of the power supply is reduced which improves the operation of the power supply.

The load can include but is not limited to a single-phase passive resistive-inductive load such a pipe. The output power, including the injected frequency component, provided from the power supply is used to directly heat the load. In this embodiment, the output power is not used to drive an electric machine. The method 600 ends at block 616.

The technical effects and benefits include reduced voltage distortion and unbalance on the input side of the power supply. The benefits also include reduced flicker in the components connected to the input side of the power supply. This can increase the life and reliability of the power supply, while meeting flicker standards.

While specific embodiments and method for practicing, the invention have been described in detail, it will be appreciated by those skilled in the art that various modification and alternatives to those details could be developed in light of the overall teaching of the disclosure. Accordingly, the particular arrangements disclosed are meant to be illustrative only and not limited to the scope of the invention which is to be given the full breadth of the following claims and any and all embodiments thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The invention claimed is:

1. A system for reducing input harmonic distortion of a power supply, the system comprising:
    a power source coupled to the power supply;
    the power supply comprising a controller;
    an input stage configured to receive an input signal from the power source, wherein the input signal comprises an input frequency, wherein the input signal is a three-phase input signal and wherein the power source is a three-phase power source;
    wherein the power supply is configured to convert the input signal to an output signal, wherein the output signal has an output frequency; and
    an output stage configured to generate output power based on the output signal;
    wherein the controller is configured to provide control signals to modify the output signal,
    wherein the controller further comprises controls to modify the output signal and a pulse-width modulation (PWM) module,
    wherein the controls modify the output signal by injecting a frequency component into the output signal,
    wherein the injected frequency component is a frequency component that is three times the output frequency of the output signal and has a phase-shift dependent on a load power factor which reduces distortion at the input stage of the power supply, and
    wherein the system further comprises a single-phase load that is insensitive to a distortion in the modified output signal.

2. The system of claim 1, wherein the single-phase load is a passive load.

3. The system of claim 2, wherein the single-phase load is pipe used to transport a fluid.

4. The system of claim 1, further comprising one or more direct current (DC) link capacitors, wherein the one or more DC link capacitors couple the input stage and the output stage of the power supply.

5. A method for reducing input harmonic distortion of a power supply, the method comprising:
    receiving an input signal representing an input voltage and estimating an input frequency of the input signal, wherein the input signal is a three-phase input signal from a power source, and wherein the power source is a three-phase power source that drives a single-phase load;
    receiving an output frequency command and comparing an output frequency with the input frequency;
    based at least in part on the comparison, modifying the output frequency to maintain a difference between the input frequency and the output frequency;
    receiving an output voltage and current signals, and estimating an output current phase angle with respect to the output voltage;
    generating an output voltage command based at least in part on the output frequency and the output current phase angle; and
    providing the output voltage command to a controller to generate switching signals,
    wherein the output voltage command is a sum of components at the output frequency and at three times the output frequency with a phase delay based at least in part on the output current phase angle,
    wherein the single-phase load is insensitive to a distortion in a modified output signal, and
    wherein if a value of the comparison is less than a pre-defined limit, the output frequency is adjusted by adding or subtracting the pre-defined limit to the output frequency.

6. The method of claim 5, wherein if a value of the comparison is greater than the pre-defined limit, the output frequency is not adjusted.

7. The method of claim 5, wherein the output voltage is used to generate heat for the single-phase load.

8. The method of claim 7, wherein the single-phase load is a pipe for transporting fluid.

9. A power supply comprising:
    an input stage configured to receive an input signal from a power source, wherein the input signal comprises an input frequency, wherein the input signal is a three-phase input signal and wherein the power source is a three-phase power source;
    an output stage configured to provide output power based on an output signal, wherein the output signal comprises an output frequency; and
    a controller configured to provide control signals to the output stage,
    wherein the controller further comprises controls and a pulse-width modulation (PWM) module to generate the controls to modify the output signal,
    wherein the controls modify the output signal by injecting a frequency component into the output signal having a phase-shift dependent on a load power factor to drive a single-phase load, and
    wherein the injected frequency component is three times the output frequency of the output signal, wherein the power supply further comprises the single-phase load, and wherein the modified output signal drives the single-phase load that is insensitive to a distortion in the modified output signal.

10. The power supply of claim 9, wherein the output stage comprises an H-bridge configuration of switches.

11. The power supply of claim 9, further comprising one or more direct current (DC) link capacitors, wherein the one or more DC link capacitors are connected to a link between the input stage and the output stage of the power supply.

* * * * *